No. 836,573. PATENTED NOV. 20, 1906.
J. K. GOURDIN.
FERTILIZER DISTRIBUTER.
APPLICATION FILED SEPT. 25, 1906.
2 SHEETS—SHEET 1.
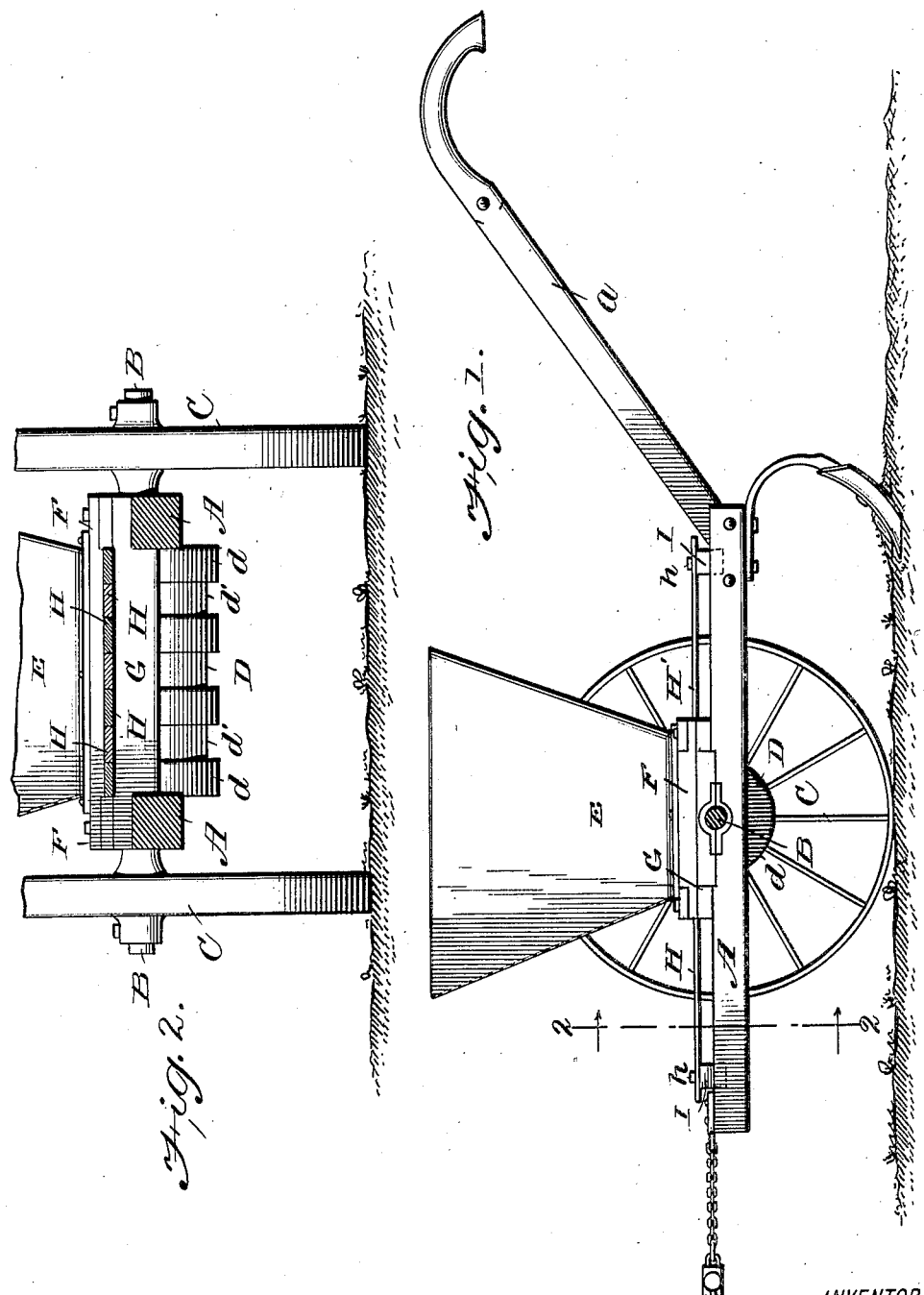
WITNESSES
INVENTOR
JOHN K. GOURDIN
BY
ATTORNEYS No. 836,573. PATENTED NOV. 20, 1906.
J. K. GOURDIN.
FERTILIZER DISTRIBUTER.
APPLICATION FILED SEPT. 25, 1906.
2 SHEETS—SHEET 2.
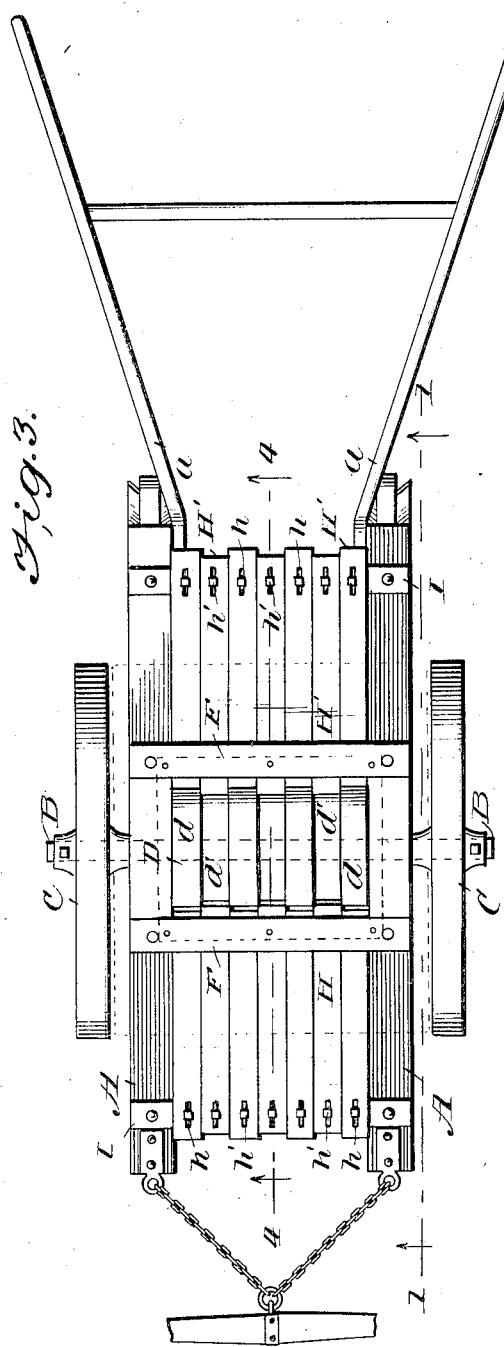
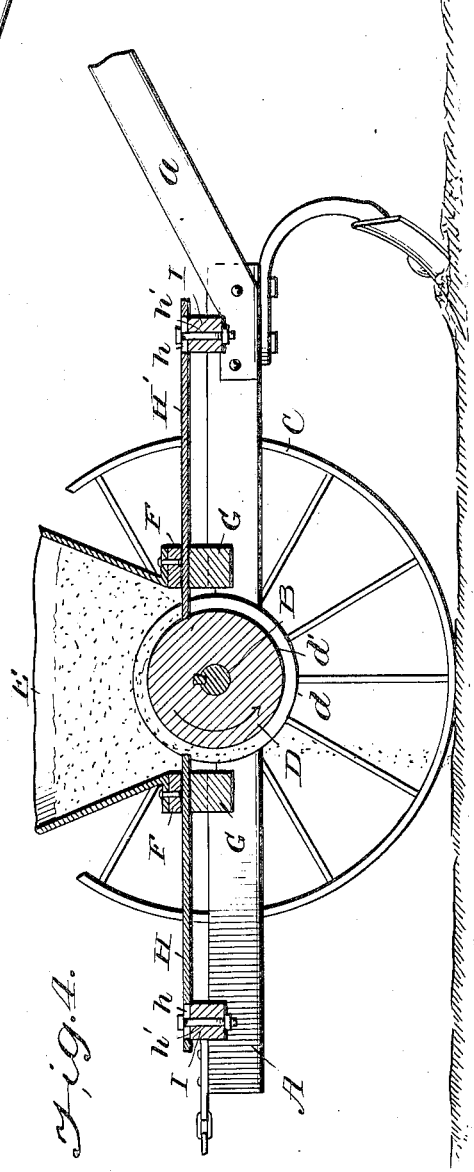
WITNESSES
F. C. Barry
Amos W Hart
INVENTOR
JOHN K. GOURDIN
BY Munn & Co.
ATTORNEYS

UNITED STATES PATENT OFFICE.

JOHN K. GOURDIN, OF PINEVILLE, SOUTH CAROLINA, ASSIGNOR OF ONE-HALF TO ROBERT L. MONTAGUE AND ROBERT P. TUCKER, OF CHARLESTON, SOUTH CAROLINA.

FERTILIZER-DISTRIBUTER.

No. 836,573.   Specification of Letters Patent.   Patented Nov. 20, 1906.

Application filed September 25, 1906. Serial No. 336,112.

*To all whom it may concern:*

Be it known that I, JOHN K. GOURDIN, a citizen of the United States, and a resident of Pineville, in the county of Berkeley and State of South Carolina, have invented a new and Improved Fertilizer-Distributer, of which the following is a full, clear, and exact description.

My invention is an improvement in fertilizer-distributers which are adapted for discharging the fertilizer broadcast and in varying quantities.

The invention is embodied in an improved construction and combination of a grooved and ribbed drum which revolves with the axle and adjustable feed-regulating slides which coact with the drum, as hereinafter described.

In the accompanying drawings, Figure 1 is a sectional elevation of the machine, the section being on line 1 1 of Fig. 3. Fig. 2 is a cross-section on the line 2 2 of Fig. 1. Fig. 3 is a plan view of the machine, omitting the hopper; and Fig. 4 is a longitudinal section on the line 4 4 of Fig. 3.

The machine-frame A is provided with handles $a$ and mounted upon an axle B, to which running-wheels C are keyed (see Figs. 1 and 3) so that they revolve together. Upon said axle is mounted a drum or roller D, which is keyed thereto so as to revolve with it. This drum is provided with a series of circumferential ribs $d$ and grooves $d'$, which alternate, as shown in Figs. 2 and 3. The drum is arranged in such manner that its upper portion or segment projects into the bottom of the hopper E. (See Fig. 4.) Within the hopper I propose in practice to arrange a suitable agitator, such as is commonly employed in fertilizer-distributers of this class. The hopper E is secured upon and to a rectangular frame F, (see especially Fig. 3,) which is in turn secured upon transverse bars or beams G, that extend between and connect the middle portions of the side bars of the main frame. The means for regulating the discharge of the fertilizer is a series of slides H, which are in the nature of narrow slats or thin bars having parallel sides and arranged close together, as shown in Fig. 3. The outer ends of these regulators rest upon a transverse bar I and are provided with lengthwise slots $h$ to receive clamping-bolts $h'$. The inner ends of the feed regulators or bars H pass through slots or openings formed between the frame F and the underlying bars G, as will be understood by reference to Figs. 2 and 4. Thus the feed-regulators are supported firmly in their required position, but adapted for speedy adjustment with relation to the drum D—that is to say, they may be adjusted lengthwise in order to increase or lessen the distance between their inner ends and the opposite portions of the drum for the purpose of allowing the greater or less discharge of fertilizer, as conditions may require. It will be noted that the slats H correspond in number with the aggregate number of the ribs $d$ and grooves $d'$ of the drum and that their width is the same as the said ribs and grooves. Thus each slat is arranged opposite a rib or groove, those which are opposite the grooves being adapted to project more or less into the latter, as shown in Fig. 4. As the machine is drawn along the friction of the running-wheels C with the ground serves to revolve the drum or roller D in the direction of the arrow, Fig. 4, and thereby the fertilizer is carried down by friction with the drum and discharged broadcast, providing all the slats or feed-regulators H be adjusted at a distance from the periphery of the drum. It is obvious that if those slats which are opposite the ribs $d$ be adjusted in close contact therewith and the intervening slats be spaced from the bottom of the grooves the fertilizer will be discharged in streams—that is to say, from the grooves alone. Ordinarily, however, the several slats H will be so adjusted as to allow discharge from the entire surface of the drum.

It has been found that by means of a drum provided with ribs and grooves, as shown in the drawings, fertilizer can be distributed with greater uniformity and regularity than with a drum having a smooth periphery, since lumps or compact portions of fertilizer which are too large to pass through the spaces between the drum and the adjacent ends of the slats H cannot obstruct the feed of fertilizer through the grooves to the same extent that they would do if lying in contact with a drum having a smooth periphery. Further, the lumps are subjected to a rubbing or a frictional action with the edges or sides of the ribs and are thus worn away or broken up much faster than is possible with a drum having a smooth periphery.

For the purpose of removing from the drum—that is to say, both from its ribs and grooves—any portion of fertilizer which may adhere in the feeding operation I provide a second series of slats H', the same being arranged in the rear of the drum in practically the same manner as the feed-regulating slats H. It will be understood that these slats H' are always adjusted close to the periphery of the drum, so as to act as scrapers for the latter.

My improved fertilizer-distributer is simple and inexpensive in construction, while effective in operation, and an adjustment of devices for regulating the feed may be easily and quickly made.

What I claim is—

1. The improved fertilizer-distributer, comprising a main frame, an axle upon which it is mounted, running-wheels which are secured to the axle, a drum fixed on the axle so as to revolve with it and provided with a series of alternating peripheral ribs and grooves, a hopper arranged over the drum, a rectangular frame secured upon the main frame and supporting the hopper, a space being provided between said frame and the underlying portion of the main frame, and a series of adjustable bars or slats constituting feed-regulators, the same being supported horizontally side by side, and their inner ends projecting through the space in the frame and into due proximity to the surface of the drum, the said slats having the same number and practically the same width as the ribs and grooves of the drum, substantially as described.

2. The improved fertilizer-distributer, comprising a main frame, an axle whereon the same is mounted, running-wheels secured to the axle, a drum mounted fast on the axle, thus revolving with it, the same being provided with alternating ribs and grooves, a hopper located above the drum, means for regulating the feed or discharge of the fertilizer, and scrapers located in the rear of the drum and comprising a series of bars or slats lying side by side, their inner ends being in contact with the periphery of the drum and their outer ends secured adjustably to the frame, substantially as described.

3. An improved fertilizer-distributer, comprising a main frame having transverse bars G, an axle supporting said frame and arranged equidistantly between the said bars, running-wheels and a drum mounted fast on the axle, the drum having alternating peripheral ribs and grooves, a rectangular frame F secured upon the transverse bars G and spaced therefrom on one side, and feed-regulating devices consisting of longitudinally-adjustable bars or slats passing through the space between the two portions of the frame and into suitable proximity to the periphery of the drum, substantially as described.

In testimony whereof I have signed my name to this specification in the presence of two subscribing witnesses.

JOHN K. GOURDIN.

Witnesses:
W. D. PALMER,
S. P. HOLLADAY, Jr.